2 Sheets—Sheet 1.

W. M. G. TURQUAND.
Apparatus for Securing Sheep to be Sheared.

No. 195,967. Patented Oct. 9, 1877.

WITNESSES:

INVENTOR:
William M. G. Turquand
By his Attorneys
Baldwin, Hopkins & Peyton

W. M. G. TURQUAND.
Apparatus for Securing Sheep to be Sheared.
No. 195,967. Patented Oct. 9, 1877.
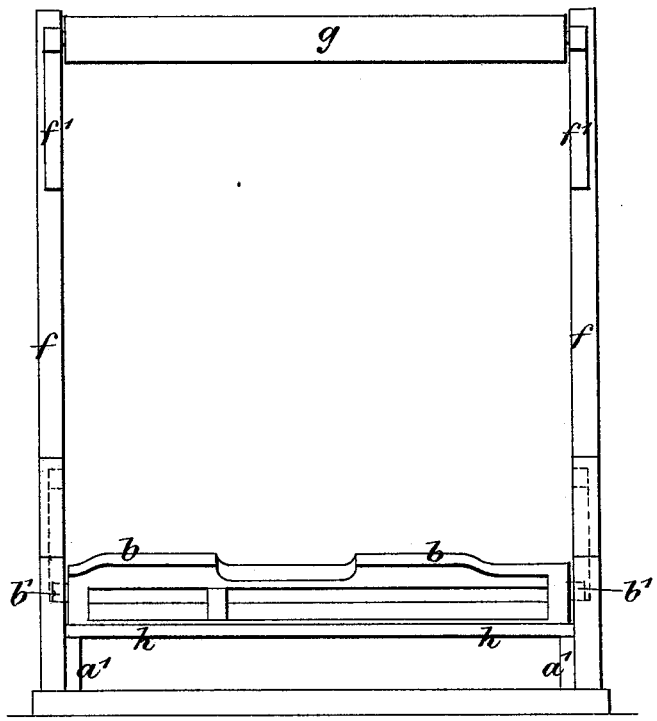
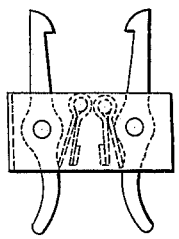 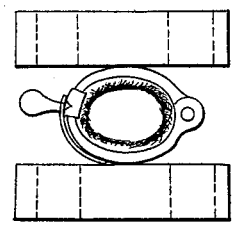 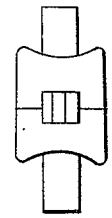

UNITED STATES PATENT OFFICE.

WILLIAM M. G. TURQUAND, OF PIMLICO, ENGLAND.

IMPROVEMENT IN APPARATUS FOR SECURING SHEEP TO BE SHEARED.

Specification forming part of Letters Patent No. 195,967, dated October 9, 1877; application filed April 11, 1877; patented in England, June 17, 1875, for fourteen years.

*To all whom it may concern:*

Be it known that I, Capt. WILLIAM MICHAEL GLYNN TURQUAND, of 18 Denbigh Place, Pimlico, in the county of Middlesex, England, have invented new and useful Improvements in Machinery and Apparatus to be Used in Examining and Shearing Sheep and other Animals, which improvements are fully set forth in the following specification, reference being had to the accompanying drawings.

This invention has for its object improvements in machinery and apparatus to be used in examining and shearing sheep and other animals.

The apparatus which I employ to hold the animal while it is being examined or shorn consists of a bed-frame and two movable or side frames carried by it. The sheep is first secured to one of the side frames, and this frame is turned into a position to present the sheep conveniently. When one side of the animal has been shorn or examined the other side frame is brought against this side, and the animal is secured to the second frame and released from the first. The second frame is then turned into a convenient position for the completion of the operation, and the animal is released.

For shearing I employ a suitable tool, which is guided by the hand while it is driven in such manner as to give to it the requisite range of movement and cause it to perform the required work.

In order that my said invention may be most fully understood and readily carried into effect, I will proceed to describe the drawings hereunto annexed.

Figure 1:
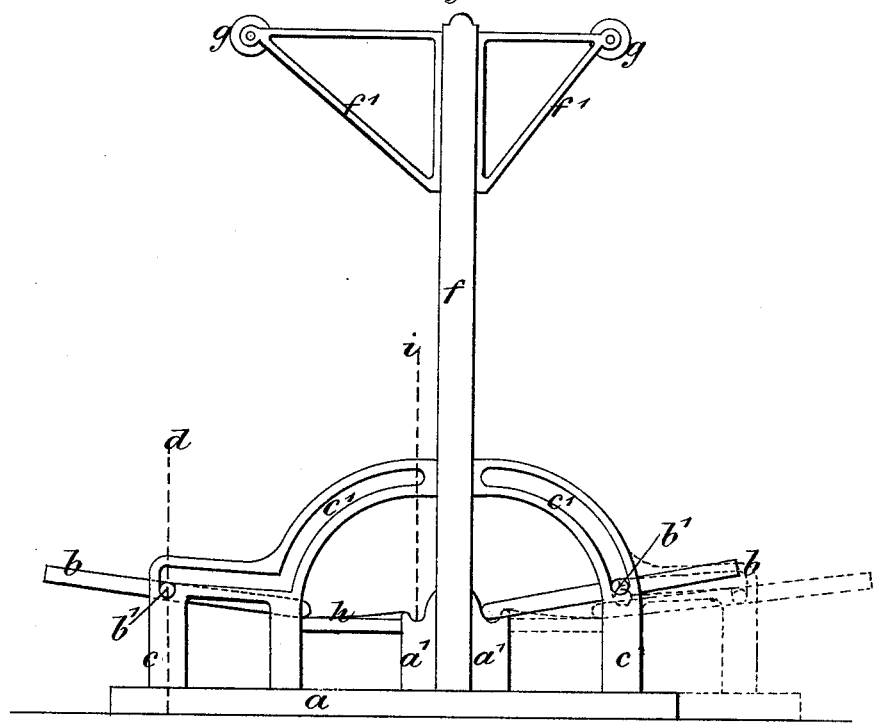
Figure 3:
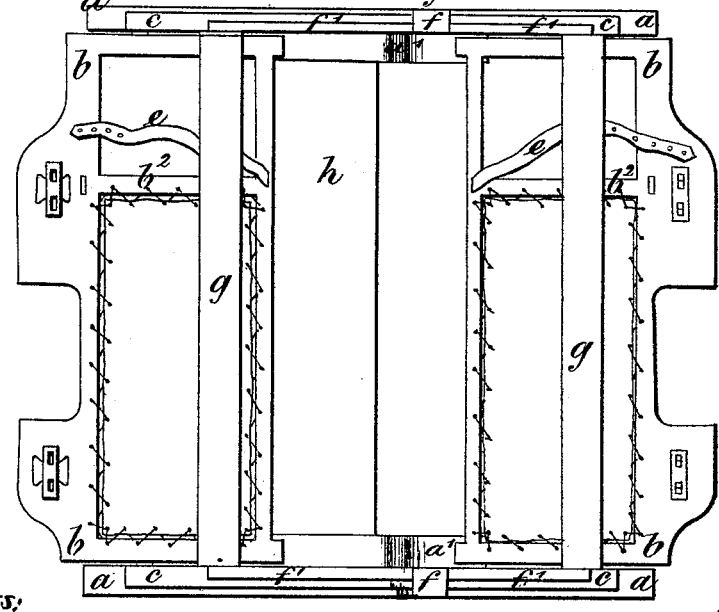

Referring to the drawing, Figure 1 is an end elevation. Fig. 2 is a side elevation, and Fig. 3 is a plan of apparatus arranged in the manner which I prefer for holding the animal.

$a$ is the bed-frame, and $b\ b$ the two movable side frames. The base of the frame $a$, which rests upon the ground, is square, and a standard, $c$, springs from each of its corners. These standards are arched over, so that the two standards at either end meet in the center. $c'\ c'$ are curved slots formed in the standards, which receive the pivots $b^1\ b^1$ of the side frames $b$. The frames $b$ are rectangular. They have a cross-bar, $b^2$, and are made of wood, and are covered with cloth or netting, preferably leaving open the smaller of the two divisions into which the frame is divided by the cross-bar; but this small division may be covered with cloth or netting having sufficient sag to accommodate the head of the animal.

At the commencement of the operation one of the frames (say that on the left hand) is turned upon its pivots into a vertical position, as indicated by the dotted line $d$ in Fig. 1. The right-hand frame $b$ may be supported exactly similar to the left-hand one, as shown by dotted lines, or the horizontal slot or extension of the guideway for the pivot may be dispensed with, as well as the continuation upon that side of the table $h$ hereinafter referred to, this modification being represented by full lines.

The animal to be shorn, having been captured, is brought alongside the frame, and its legs are secured to the frame by clips.

Fig. 4 is a plan, and Fig. 5 is an end elevation, of one of the clips used for the legs. Two legs (either the fore legs or the hind legs) are shut in the same clip.

The clip, which somewhat resembles a bracelet, is an iron band padded on the inner side, and provided with a hinge-joint and spring-catch. The clip opens to receive the legs, and, having been clasped around them, is secured by the catch. On either side of the clip a plate having two holes in it is riveted. The holes are to receive the ends of the hooks or latches by which the clips are held. One pair of the latches, which are fixed to the frame $b$, is shown separately at Fig. 6. They form, as will be seen, a ready means for attaching the clips to and detaching them from the side frame.

The neck of the animal is held down against a cross-bar, $b^2$, of the frame $b$ by means of a strap, $e$. The end of the strap is passed through a hole formed in the frame $b$, and is secured by a pin. $f\ f$ are uprights, with brackets $f'\ f'$ attached to them, carrying rollers $g\ g$, which are rotated in any convenient manner, and the power to work the shearing apparatus is taken from them by elastic bands. While the shearing is being performed, the frame $b$ is placed in the position shown by the drawing, resting on a table, $h$, near the center of the bed-frame.

The recesses in the sides of the frames $b$ are to permit the shearer to approach more closely to his work than he otherwise could.

After one side of the animal has been examined or shorn, the frame to which it is secured is moved into the position indicated by the dotted line $i$, its lower side resting on the support $a'$. Then the other side frame $b$ is brought up into a corresponding position on the other side of the animal, which for the moment will be held head downward. The feet-clips become attached to the second frame, and they are released from the first after becoming engaged with the second frame $b$. The neck-straps having been adjusted, the second frame $b$, with the animal, is lowered to the position in which it is shown in the drawing, and the shearing of the second or left side is proceeded with.

Hand-shears may be used; but I prefer mechanical shears driven by an elastic band.

Having thus described the nature of my said invention, and the manner of performing the same, I would have it understood that I do not confine myself to the exact details described; but

I claim—

1. The combination, substantially as hereinbefore set forth, of the bed-frame, the movable side frames, and the bed-frame standards, united by slotted arches, to receive the pivots of the side frame and admit of their adjustment, for the purpose specified.

2. The adjustable side frame, provided with the cross-bar $b^2$ and strap near one end, as and for the purpose set forth.

3. The combination of the adjustable side frames, the jointed spring, leg-clips, and the latches carried by the frames and engaging the clips, substantially as and for the purpose specified.

4. The combination, substantially as hereinbefore set forth, of the bed-frame, the adjustable side frames, and the central support for the lower or inner sides of the adjustable frames.

5. The combination of the adjustable side frame, the slotted arches, the table $h$, and the central support $a'$, substantially as set forth.

6. The combination of the bed-frame, the adjustable side frames, the uprights $ff$, and the rollers supported thereby, substantially as and for the purpose set forth.

W. M. GLYNN TURQUAND.

Witnesses:
CHAS. BERKLEY HARRIS,
JNO. C. DEAN,
*Both of* 17 *Gracechurch Street, London.*